Dec. 22, 1964  S. W. OWENS  3,162,410

RANGE POLE HOLDER

Filed May 31, 1963

INVENTOR.
STEPHEN W. OWENS
BY
Salvatore G. Militana,
attorney

United States Patent Office 3,162,410
Patented Dec. 22, 1964

3,162,410
RANGE POLE HOLDER
Stephen W. Owens, 89 NW. 85th St., Miami, Fla.
Filed May 31, 1963, Ser. No. 284,572
2 Claims. (Cl. 248—46)

This invention relates generally to survey instruments and is more particularly directed to a range pole holder.

A principal object of the present invention is to provide a range pole holder with a triangular shaped head for receiving the range pole and a resilient locking tab fastened to one side of the triangular head for locking the range pole securely in the vertex of the other two sides of the triangular head.

Another important object of the present invention is to provide a range pole holder with a triangular shaped head forming an angular niche against which the range pole is held by the rodman's thumb during the process of plumbing and setting the rod preparatory to locking the rod in its proper position.

A further object of the present invention is to provide a range pole holder with a triangular shaped head formed by welding together three T-hinges along the edges of the pad portion and securing the straps of the hinges to wood legs or the like.

A still further object of the present invention is to provide a range pole holder which is simple in construction, light in weight, easy to carry, inexpensive in cost and most effective to set up and plumb a range rod and maintain it locked firmly in position.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figures 1, 2, 3, 4:
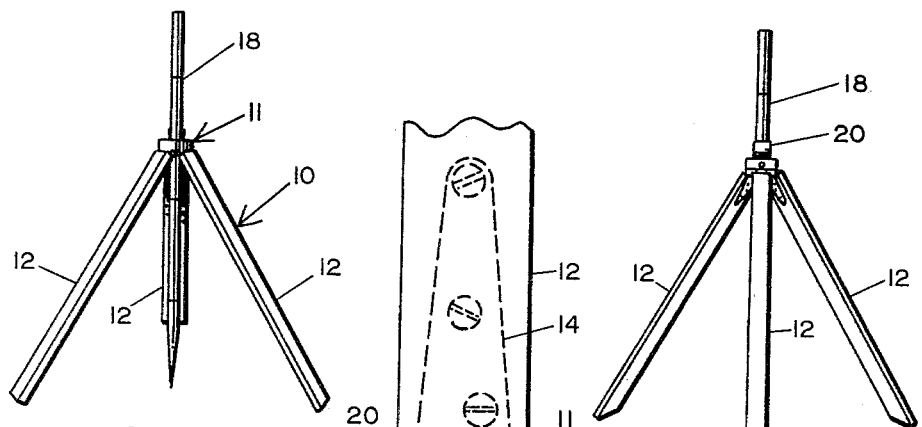
FIGURE 1 is a front elevational view of a range pole holder constructed in accordance with my invention.
FIGURE 2 is a rear elevational view.
FIGURE 3 is a fragmentary top plan view.
FIGURE 4 is a cross sectional view taken along the line 4—4 of FIGURE 3.

Referring to the drawing wherein like numerals are used to designate similar parts throughout the several views, the numeral 10 refers to my range pole holder which consists of a triangular shaped head 11 supported on legs 12. The hollow triangular head 11 is constructed by welding or otherwise fastening together three T-hinges each comprising a pad 13, a strap 14 and a joint 19 in which a hinge pin 15 is mounted. The edges of the pads 13 are welded together as at 16 to position the pads 13 vertically. The straps 14 are secured to the legs 12 made preferably of wood having square cut edges at their lower ends to provide a purchase on either soft surfaces such as earth or hard pavements as on highways roads and the like.

The inner surface of the head 11 is lined with a liner 17 such as rubber, plastic and the like on two sides only, the third or rear side being plain. The head 11 is sufficiently large to accommodate and receive rods of all sizes and shapes. The rod 18 is a typical hexagonal shaped rod made of wood, though any shaped rod constructed of any other desirable material may be used. The rod 18 is inserted into the head 11 and placed in a vertical position. The rodman forces the rod 18 into the niche formed by the two pads 13 of the hinges bearing against the plastic material 17. The legs 12 are adjusted to place the rod 18 in vertical alignment with a stake or mark. When the rod 18 is in its proper vertical position over the stake or mark, a locking member 20 which is secured to the rear hinge pad 13 by means of a bolt 21 is locked against the rod 18. The rod 18 bears against the two side hinges having the rubber liner 17 while the third point of contact being furnished by the locking member 20 to hold the rod 18 securely in position. The locking tab 20 is made of a resilient but firm material such as rubber, plastic and the like which when bent at its midportion as shown will exert a strong force against the rod 18 to hold the rod 18 in place and prevent the range pole 18 from shifting, wobbling or rotating until the locking tab 20 is lifted from its bent position and released to become straightened as shown by dotted lines in FIGURE 4. When the rod 18 is so released, the rod 18 can be readily removed from the head 11. The legs 12 are then folded together and with the rod 18 readily carried to the next location to be sighted.

Having described my invention, what I claim as new and desire to secure by Letters Patent of the United States is:

1. A range pole holder comprising three hinge members, each of said hinge members having a pad, a strap and pin pivotally securing said pad to said strap, means securing edge portions of said pads together in a substantially vertical position to form a triangular shaped head for receiving a rod, leg portions secured to said straps for supporting said head, resilient material secured to the inner surfaces of two of said pads, and pole locking means mounted on said third pad for engaging said pole and securing said pole in said triangular head.

2. A range pole holder comprising three hinge members, each of said hinge members having a pad, a strap and pin pivotally securing said pad to said strap, means securing edge portions of said pads together in a substantially vertical position to form a triangular shaped head for receiving a rod, leg portions secured to said straps for supporting said head, resilient material secured to the inner surfaces of two of said pads, and an elongated resilient lock member secured at one end to said third pad for locking a rod against said resilient material in said head.

References Cited by the Examiner
UNITED STATES PATENTS

| 1,997,870 | 4/35 | Merrill | 248—48 |
| 2,537,826 | 1/51 | Hauser | 248—46 |
| 3,058,707 | 10/62 | Lego | 248—46 |

FRANK L. ABBOTT, *Primary Examiner.*
CLAUDE A. LEROY, *Examiner.*